United States Patent
Von Strandtmann et al.

[15] 3,699,128
[45] Oct. 17, 1972

[54] 3-METHYLSULFINYL AND 3-METHYLSULFONYL-4-CHROMANONES

[72] Inventors: Maximilian Von Strandtmann, Rockaway; Sylvester Klutchko, Hackettstown; John Shavel, Jr., Mendham, all of N.J.

[73] Assignee: Warner-Lambert Company, Morris Plains, N.J.

[22] Filed: May 26, 1971

[21] Appl. No.: 147,184

[52] U.S. Cl. ............260/345.2, 424/283, 260/345.5
[51] Int. Cl. .................................................C07d 7/34
[58] Field of Search....................................260/345.2

[56] References Cited

OTHER PUBLICATIONS

Becker et al., J. Am. Chem. Soc., Vol. 85, pp. 3410–3414 (1963).

*Primary Examiner*—John M. Ford
*Attorney*—Albert H. Graddis, Frank S. Chow, Neil D. Edwards, Edward G. Comrie and Ann M. Kelly

[57] ABSTRACT

The present invention is concerned with compounds of type I and II.

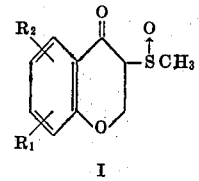 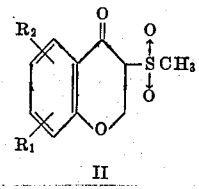

I  II wherein $R_1$ and $R_2$ are hydrogen, halogen, hydroxy, alkoxy, alkyl, aryl, aralkyl and $R_1$ and $R_2$ taken together with the benzene ring can constitute another aromatic ring. These compounds are useful in providing symptomatic relief of allergic manifestations such as bronchial asthma.

8 Claims, No Drawings

3-METHYLSULFINYL AND 3-METHYLSULFONYL-4-CHROMANONES

The present invention relates to certain chromanones having the following structural formula:

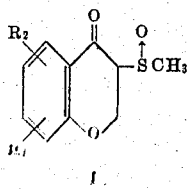 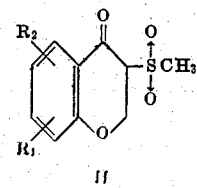

wherein $R_1$ and $R_2$ are hydrogen, halogen, hydroxy, alkoxy, alkyl, aralkyl and $R_1$ and $R_2$ taken together with the benzene form another aromatic ring system.

As used throughout this specification and in the claims, "halogen" is meant to include all four members of its family, i.e., chlorine, iodine, bromine and fluorine. "Alkyl" and the "alkyl" portion of alkoxy is meant to contain from one to seven carbon atoms, e.g., methyl, ethyl, propyl, isopropyl and the like. The term "aryl" denotes an aromatic ring system such as phenyl and the term "aralkyl" encompasses those groups such as phenyl lower alkyl, for example benzyl and the like.

The compounds of this invention exhibit the ability to prevent allergic manifestations in a mammalian host. For example, in tests conducted along the procedures set forth in I. Mota *Life Sciences*, 7, 465 (1963); Z. Ovary and O. Bier, *Proc. Soc. Exptl. Biol. Med.*, 81, 584 (1952), these compounds are capable of preventive experimentally induced allergic reactions in mammalian hosts such as rats at an oral dosage of 20 mg/kg.

The compounds of this invention are useful in providing symptomatic relief in the allergic reactions such as bronchial asthma in humans or animals. Generally speaking, a dosage regimen of about 0.5 gram to 1 gram in several daily divided doses is recommended.

In order to use these compounds, they are formulated with known pharmaceutical diluents such as lactose or mannitol into dosage forms such as tablets or powders by standard procedures known to the pharmacist's art.

According to the present invention, the above compounds are prepared according to the following reaction scheme:

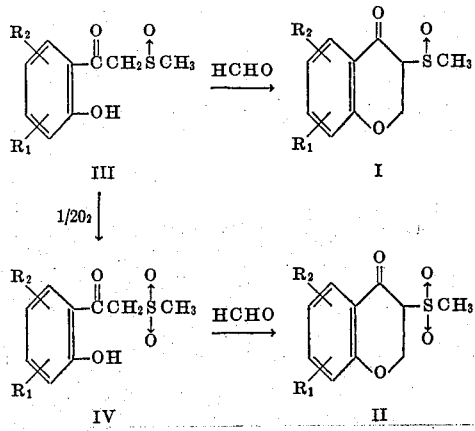

Starting material III is prepared in accordance with our description set forth in our co-pending application Ser. No. 112,765, filed on Feb. 4, 1971, or JACS 85: 3410 (1963).

Intermediate compounds IV are also novel compounds and they are also included within the scope of this invention.

Compounds corresponding to Structure I above can be reduced with complex metal hydrides to give the following type of compounds:

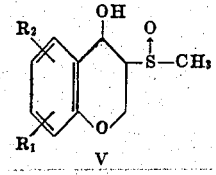

These compounds are novel and will form the basis of another application.

In order to further illustrate the practice of the invention, the following Examples are included:

EXAMPLE 1

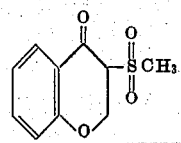

3-(Methylsulfonyl)-4-chromanone

A stirred mixture of 8.4 g (0.04 mole) of 2'-hydroxy-2-(methylsulfonyl)acetophenone, 3.25 g (0.04 mole) of 37 percent aqueous formaldehyde, 12 drops of piperidine and 100 ml of methanol was heated on the steam bath at reflux for 5 minutes. Most solid went into solution (yellow) as a new solid separated. At the boiling point this too went mostly into solution. The reaction mixture was concentrated to one-half volume at atmospheric pressure and filtered hot to remove small amount of solid. On cooling the filtrate yielded 4.0 g (44.3 %) of crystals melting at 144°–146° C. Recrystallization from methanol gave pure white crystals melting at 151°–153° C.

Anal. Calcd for $C_{10}H_{10}O_4S$: C, 53.09; H, 4.46; S, 14.17 Found: C, 53.24; H, 4.47; S, 14.14.

EXAMPLE 2

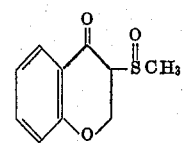

3-(methylsulfinyl)-4-chromanone

A solution of 19.8 g (0.1 mole) of 2'-hydroxy-2-(methylsulfinyl)acetophenone, 250 ml of methanol, 8.1 g (0.1 mole) of 37 percent formaldehyde solution and 7 drops of piperidine was maintained at reflux for 15 minutes and concentrated. Methylene chloride (125 ml) and then ether (350 ml) were added to the crude residue. The turbid solution was treated with "Super cel," charcoaled, filtered and concentrated. The tacky residue was triturated with ether (100 ml) and filtered to give 20.0 g (95.3 percent) of crude material, m.p.

85°–88°. This material was apparently a mixture of isomers. Recrystallization from ethyl acetate gave 8.5 g (40.6%) of constant melting crystals- m.p. 104°–106° C.

Anal. Calcd for $C_{10}H_{10}SO_3$: C, 57.13; H, 4.79; S, 15.25
Found: C, 57.10; H, 4.74; S, 15.01.

EXAMPLE 3

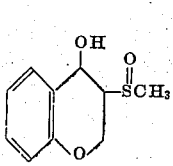

3-(methylsulfinyl)-4-chromanol

A quantity of 3.8 g (0.1 mole) of sodium borohydride was added to a stirred solution of 7.0 g (0.033 mole) of 3-(methylsulfinyl)-4-chromanone in 75 ml of absolute ethanol. The color became orange and the reaction was mildly exothermic with the temperature rising to 40° C. After one and one-half hours the color had disappeared. Most of the ethanol was removed at reduced pressure. Added 100 ml water to the residue and then added solid $K_2CO_3$ to saturate. The separated material was extracted into 200 ml of methylene chloride. The dried ($K_2CO_3$) solution was filtered and concentrated. The TLC showed at least three isomers were present. The semi-crystalline residue was dissolved in 25 ml of hot ethyl acetate. On cooling white crystals separated weighing 1.7 g and melting at 107°–110° C. Recrystallization from ethyl acetate gave the pure, least soluble, isomer melting at 107°–110° C.

Anal. Calcd for $C_{10}H_{12}O_3S$: C, 56.58; H, 5.70; S, 15.11
Found: C, 56.87; H, 5.68; S, 14.88.

EXAMPLE 4

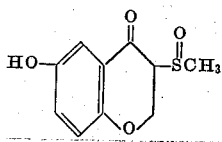

6-hydroxy-3-(methylsulfinyl)-4-chromanone

A refluxing solution of 6.42 g of 2', 5'-dihydroxy-2-(methylsulfinyl)acetophenone, and 2.7 g of formalin in 125 ml of methanol was treated with several drops of piperidine, and refluxed for 15 minutes. The solution was concentrated to ca. ½ its volume under reduced pressure, and chilled. The crystalline precipitate was filtered off and recrystallized from methanol, m.p. 168°–70bL resolid 229°–35°; yield, 1.5 g (22%); λ max mμ (ε) 215 (16,800), 263 (9,450), 367 (3,600); ν max 725 (m), 770 (m), 1000 (ms), 1035 (ms), 1180 (m), 1235 (m), 1265 (m), 1670 (m), 3100 (m) cm⁻¹.

Anal. Calcd for $C_{10}H_{10}O_4S$: C, 53.09; H, 4.46; S, 14.17.
Found: C, 53.21; H, 4.42; S, 14.07.

EXAMPLE 5

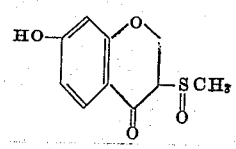

7-hydroxy-3-(methylsulfinyl)-4-chromanone

To a suspension of 4.28 g of 2', 4'-dihydroxy-2-(methylsulfinyl)acetophenone and 1.6 g of formalin in 100 ml of methanol was added a few drops of piperidine, and the suspension was refluxed. After a few minutes a clear solution formed, then a crystalline precipitate deposited. Reflux was stopped after a total of ½ hour. The mixture was chilled, and the crystalline precipitate was filtered, and recrystallized from methanol, m.p. 188.5°–90°; yield, 3g (66 percent); λ max mμ (ε) 208 (18,400), 237 (7,000), 287 (11,500), 321 (9,700); ν max 840 (m), 1010 (ms), 1125 (m), 1170 (m), 1250 (m), 1280 (ms), 1610 (ms), 1660 (ms) cm⁻¹.

Anal. Calcd for $C_{10}H_{10}O_4S$: C, 53.09; H, 4.46; S, 14.17.
Found: C, 53.13; H, 4.49; S, 14.07.

EXAMPLE 6

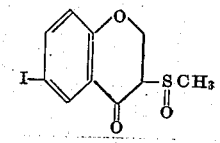

6-Iodo-3-(methylsulfinyl)-4-chromanone

To a solution of 12 g of 2'-hydroxy-5'-iodo-2-(methylsulfinyl)acetophenone and 3.36 g of formalin in 150 ml of MeOH was added a few drops of piperidine, and the solution refluxed for 15 minutes. The solution was concentrated to ca ½ its volume under reduced pressure, and on cooling, crystals formed. The crystals were filtered, and recrystallized from acetone, m.p. 123.5°–25°; yield 3 g (23 percent); λ max mμ (ε) 229 (31,000), 255 (9,500), 345 (2,800); ν max 830 (ms), 1030 (ms), 1135 (m), 1280 (m), 1595 (m), 1695 (s) cm⁻¹.

Anal. Calcd for $C_{10}H_9IO_3S$: C, 35.73; H, 2.70; S, 9.54; I, 37.75.
Found: C, 35.99; H, 2.73; S, 9.80; I, 37.67.

EXAMPLE 7

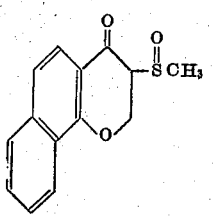

2,3-dihydro-3-(methylsulfinyl)-4H-naphtho[1,2-b]pyran-4-one

A mixture of 40.0 g (0.162 mole) of 1'-hydroxy-2-(methylsulfinyl)-2'-acetonaphthone, 13.14 g (0.162 mole) of 37 percent aq. formaldehyde and 800 ml of methanol was heated on the steam bath until most solid dissolved. Piperidine (40 drops) was added and the resulting deep yellow solution was maintained at reflux for 15 minutes and stripped of methanol at reduced pressure. Ether (200 ml) and then petroleum ether (100 ml) were added to give 25 g (59.3 percent) of crude, melting at 100°–103° C. Recrystallization from ethyl acetate gave pure, yellow crystals melting at 103°–105° C.

Anal. Calcd for $C_{14}H_{12}O_3S$: C, 64.60; H, 4.65; S, 12.32.

Found: C, 64.83; H, 4.70; S, 12.57.

EXAMPLE 8

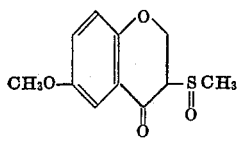

6-Methoxy-3-(methylsulfinyl)-4-chromanone

A solution of 11.3 g of 2'-hydroxy-5'methoxy-2-(methylsulfinyl)acetophenone, and 4 g of formalin in 125 ml of methanol was treated with a few drops of piperidine, and the solution was refluxed for 15 minutes. The solution was concentrated to ½ its volume under reduced pressure, the concentrate was chilled, and the crystals that formed were filtered off, and recrystallized from methanol, mp 118°–20°; yield 1.5 g (12.5 percent); λ max mμ (ε) 217 (18,400), 262 (9,200), 361 (3,640); ν max 840 (mw), 1055 (ms), 1180 (m), 1200 (m), 1285 (m), 1665 (m) cm$^{-1}$.

Anal. Calcd. for $C_{11}H_{12}SO_4$: C, 54.99; H, 5.03; S, 13.34

Found: C, 55.11; H, 4.97; S, 13.47

EXAMPLE 9

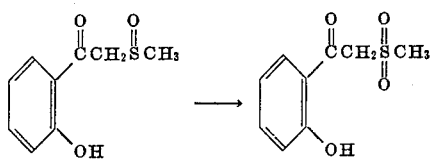

2'-hydroxy-2-(methylsulfonyl)acetophenone

A quantity of 18.3 g (0.09 mole) of 85 percent m-chloroperbenzoic acid was added portionwise over 5 minutes to a stirred solution of 19.8 g (0.1 mole) of 2'-hydroxy-2-(methylsulfinyl)acetophenone in 600 ml of chloroform at 26° C. The reaction was exothermic (max. T = 44° C). After stirring for 20 minutes, the solution was brought to reflux for 5 minutes, cooled and stirred vigorously for 10 minutes with 500 ml 5 percent sodium bicarbonate. The separated organic layer was dried over sodium sulfate, filtered, and concentrated to 300 ml volume. Addition of 200 ml of petroleum ether gave 14.7 g (76.3 percent yield based on peracid) mp 139°–141° C. Recrystallization from ethyl acetate gave pure, pale yellow crystals melting at 140°–142° C.

We claim:

1. A member selected from the group consisting of compounds of the formula:

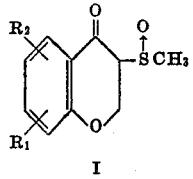 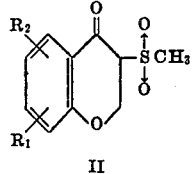

I          II wherein $R_1$ and $R_2$ are hydrogen, halogen, hydroxy, lower alkoxy, lower alkyl, phenyl, phenyl lower alkyl or $R_1$ and $R_2$ taken together with the benzene form an additional benzene ring.

2. A compound according to claim 1 which is 3-Methylsulfonyl 4-chromanone.

3. A compound according to claim 1 which is 3-(methylsulfinyl)-4-chromanone.

4. A compound according to claim 1 which is 6-hydroxy-3-(methylsulfinyl)-4-chromanone.

5. A compound according to claim 1 which is 7-hydroxy-3-(methylsulfinyl)-4-chromanone.

6. A compound according to claim 1 which is 6-Iodo-3-(methylsulfinyl)-4-chromanone.

7. A compound according to claim 1 which is 2,3-dihydro-3-(methylsulfinyl)-4H-naphtho[1,2-b] pyran-4-one.

8. A compound according to claim 1 which is 6-Methoxy-3-(methylsulfinyl)-4-chromanone.

* * * * *